United States Patent [19]

Latif et al.

[11] Patent Number: 5,070,477

[45] Date of Patent: Dec. 3, 1991

[54] PORT ADAPTER SYSTEM INCLUDING A CONTROLLER FOR SWITCHING CHANNELS UPON ENCOUNTERING A WAIT PERIOD OF DATA TRANSFER

[75] Inventors: Farrukh A. Latif, Malvern; Michael D. Stevens, Fraser, both of Pa.

[73] Assignee: Unisys Coporation, Detroit, Mich.

[21] Appl. No.: 328,807

[22] Filed: Mar. 23, 1989

Related U.S. Application Data

[63] Continuation of Ser. No. 37,670, Apr. 13, 1987, abandoned.

[51] Int. Cl.[5] .................. G06F 13/12; G06F 13/18
[52] U.S. Cl. .......................... 395/325; 364/238,3; 364/238.5; 364/241.9; 364/927.92; 364/927.94; 364/927.99; 364/935.2; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,675,209 | 7/1972 | Trost et al. | 364/200 |
| 3,916,380 | 10/1975 | Fletcher et al. | 364/200 |
| 4,387,440 | 6/1983 | Eaton | 364/900 |
| 4,394,734 | 7/1983 | Norgren et al. | 364/200 |
| 4,602,331 | 7/1986 | Sheth | 364/200 |
| 4,630,232 | 12/1986 | Loskorn et al. | 364/900 |
| 4,747,047 | 5/1988 | Coogan et al. | 364/200 |
| 4,750,107 | 6/1988 | Buggert | 364/200 |

Primary Examiner—Thomas C. Lee
Assistant Examiner—Ayni Mohamed
Attorney, Agent, or Firm—Nathan Cass; Mart T. Starr

[57] ABSTRACT

A port adapter for an input/output system for a large data processing system. The port adapter is coupled to an I/O processor of that system and also to main memory of the system so that when the port adapter is selected by a system interrupt message from the I/O processor, it can begin and carry on its data transmission between a selected peripheral device and main memory without further assistance. The port adapter has two peripheral interface transceivers so that it can concurrently control data transfers to at least two peripheral devices.

6 Claims, 8 Drawing Sheets

_Fig.5B_
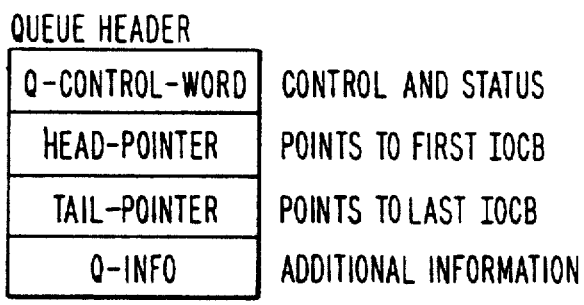
_Fig.5C_
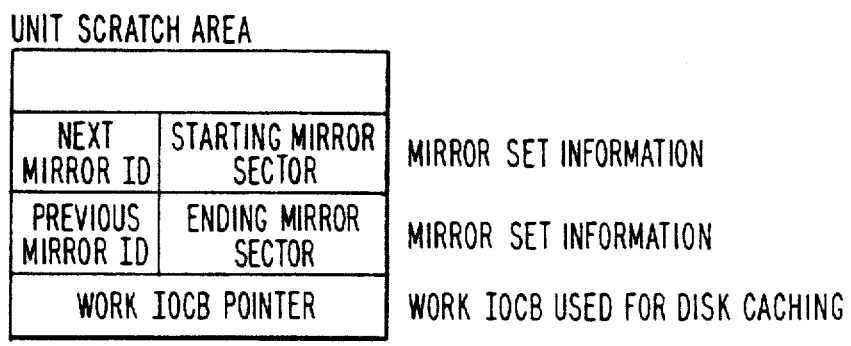
_Fig.5D_
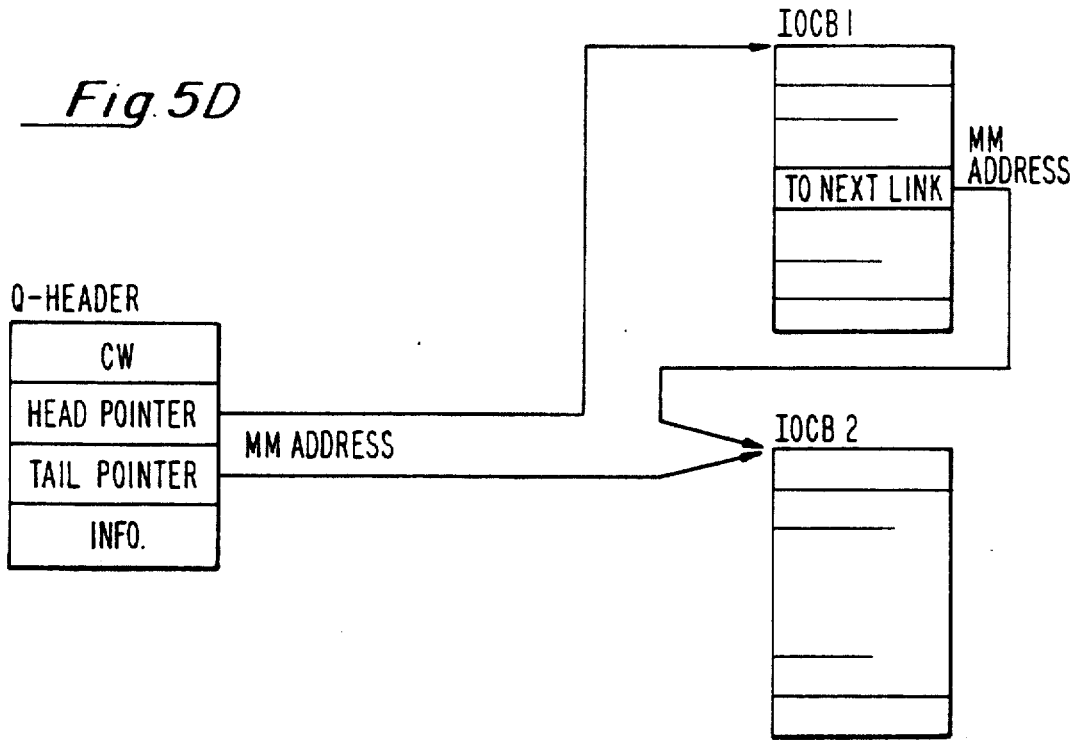

Fig. 6

| ADDR | | | |
|---|---|---|---|
| | 0 | ENTRY 0 | IO BUS (CHNL 1) |
| | 4 | ENTRY 1 | CONTROLLER (DLP) |
| QST | 8 | ENTRY 2 | CONTROLLER (DLP) |
| | 12 | ⋮ | |
| | | ENTRY 63 | CONTROLLER (DLP) — 64 |
| | 256 | ENTRY 64 | IO BUS (CHNL 2) |
| | 260 | ENTRY 65 | CONTROLLER (DLP) |
| | 264 | ENTRY 66 | CONTROLLER (DLP) |
| | | ⋮ | |
| | | ENTRY 127 | CONTROLLER (DLP) |
| | 512 | PA CONSTANTS & VARIABLES | |
| | 1534 | | |
| | 1535 | MEMORY BASE | |
| | 1536 | DLP ACQUIRE TABLE | — 66 |
| | 1551 | | |
| | 1552 | SCRATCH | |
| | TBS | FAULT BUFFER | CHNL 1 |
| | TBS | FAULT BUFFER | CHNL 2 |
| | 2032 | ENTRY FOR PA ONLY | — 67 |
| | 2048 | ENTRY 0 | OUTBOARD IO |
| IPOT | 2056 | ENTRY 1 | OUTBOARD IO |
| | | ⋮ | |
| | 4088 | ENTRY 255 | OUTBOARD IO |

55

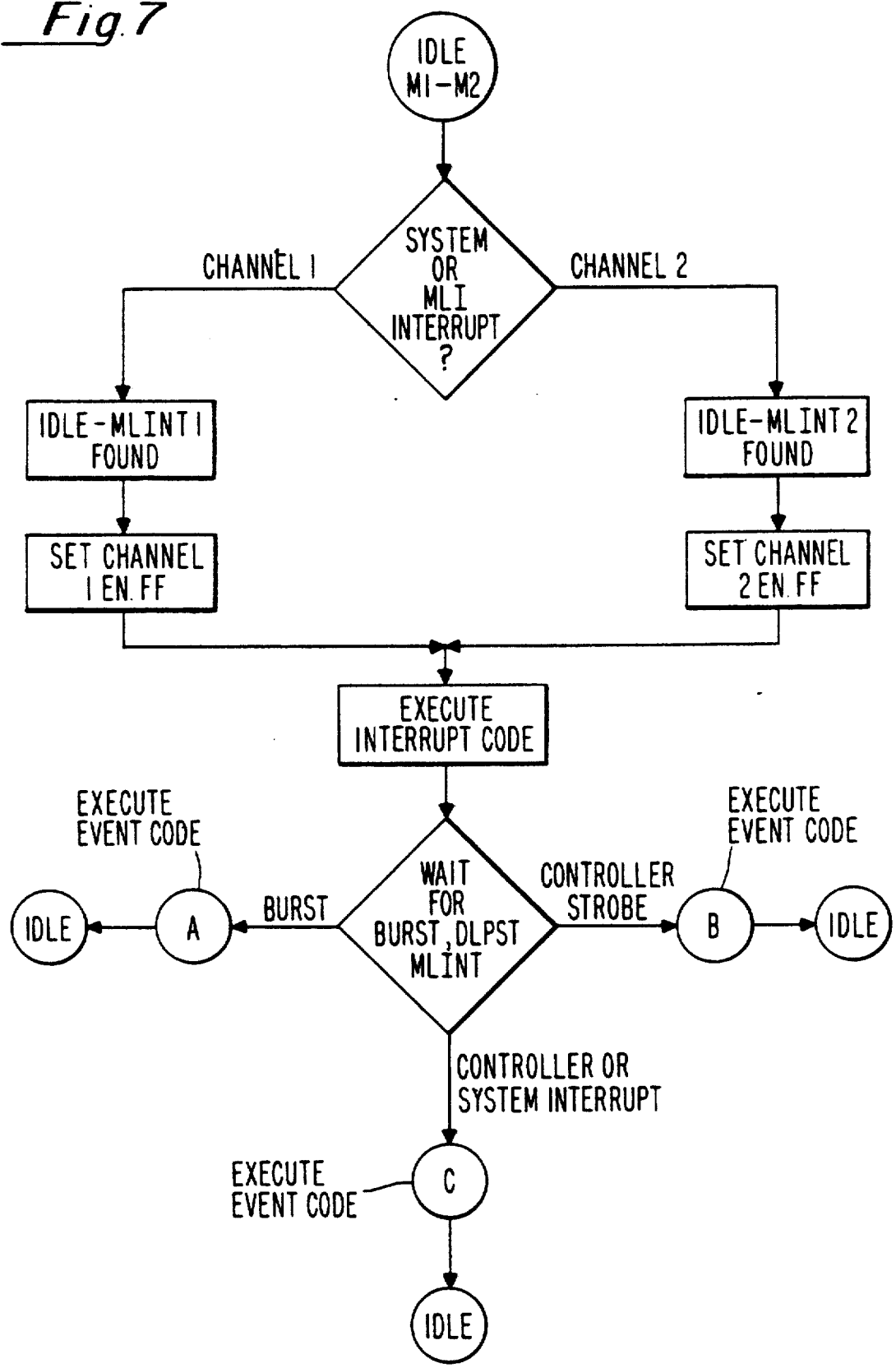

PORT ADAPTER SYSTEM INCLUDING A
CONTROLLER FOR SWITCHING CHANNELS
UPON ENCOUNTERING A WAIT PERIOD OF
DATA TRANSFER

This is a continuation of co-pending application Ser. No. 07/037,670, now abandoned, filed on 4/13/87.

BACKGROUND OF THE INVENTION

1. Field of the Invention

This invention relates to a port adapter or bus driver for an input/output system for a very large computer system and more particularly to such a port adapter wherein particular I/O software functions are implemented in the port adapter of the I/O hardware system.

2. Description of the Prior Art

A very large multi-processing system or a very large single processing system adapted for multi-programming require large amounts of data in their various computations and thus are provided with a hierarchy of storage units ranging from main memory to bulk storage devices such as disk drives to peripheral devices such as tape drives, and the like. The system is provided with I/O controllers which control the data transfer from the peripheral devices to the main memory. However, in such prior art systems the central processors are required to decode the I/O instructions and send the respective control signals to the I/O controllers and this takes up an unduly amount of the processor's execution time. Examples of such prior art controllers are disclosed in the Annunziata et al. U.S. Pat. No. 3,432,813 and the Calta et al. U.S. Pat. No. 3,447,138.

Attempts have been made to free the central processor from this I/O execution so that the central processor can spend more time on user jobs by supplying a separate general purpose processor to operate independently in the control of input/output data transfers. However, there must be some communication between the two processors in order to assure that the data required by the main central processor is received in its main memory prior to the central processor utilizing that data.

Input/output operations include more than just data transfers between the periphery and main memory. For example, the I/O system must control such non-data transfer operations as monitoring and altering the state of devices. Furthermore, in very large data processing systems, there are a number of different buses and peripheral controllers that may be chosen to optimize through-put from the periphery to main memory and vice versa. However, these functions are handled by an operating system running on a central processor, requiring the processor to spend additional time that could be employed in running user jobs or tasks.

Statistical studies indicate that a major portion of each processor's time, in a multi-processing system, is employed in executing operating system functions. From these studies, it is estimated that the overhead of such management functions has been anywhere between 10 percent and 50 percent, and occasionally even higher. Furthermore, a goodly portion of the time that the corresponding central processor is executing operating system functions is employed in establishing process priority, performing functions on events (to be defined below) and initiating input/output operations. If these functions could be removed from the operating systems, then the through-put of the data processing system should be substantially enhanced.

It is then an object of the present invention to provide an improved input/output system that in turn increases the through-put of the data processing system.

It is another object of the present invention to provide an improved input/output system which allows the removal from the operating system of those functions which require a goodly percentage of the central processor's time.

It is still a further object of the present invention to provide an improved input/output system having facilities for performing those functions that would otherwise be a part of the operating system stored in main memory.

SUMMARY OF THE INVENTION

In order to accomplish the above-identified objects, the present invention resides in a port adapter or bus driver for an input/output system for a large data processing system. The port adapter is coupled to an I/O processor of that system and also to the main memory of the system so that when the port adapter is selected by a system interrupt message from the I/O processor, it can begin its data transmission between a selected peripheral device and main memory without further assistance from the I/O processor or other processors in the system. A task control processor is provided with the I/O system for the scheduling of different central processors for the highest priority processes to be run. When an I/O operation is detected, the respective central processor is released from that process that it is currently running so that it can be assigned to the next highest priority process. When the requested I/O operation has been completed, the Task Control Processor is signaled so that the task control processor can put the requesting process back into the priority list of processes to be run by the main central processors.

It is, then, a feature of the present invention to provide an improved port adapter for an input/output system that relieves the operating system of a very large data processing system of much of the I/O functions thereby allowing the central processors of the system to be utilized for running user tasks and processes.

BRIEF DESCRIPTIONS OF THE DRAWINGS

The above and other objects, advantages and features of the present invention will become more readily apparent from a review of the following specification when taken in conjunction with the drawings wherein.

FIG. 5A-D represent other tables in memory employed with the present invention and the relation there between;

FIG. 6 is a diagram of the local memory organization employed in the present invention; and FIG. 7 is a flow chart of the method employed with the present invention.

GENERAL DESCRIPTION OF THE INVENTION

Figure 1:
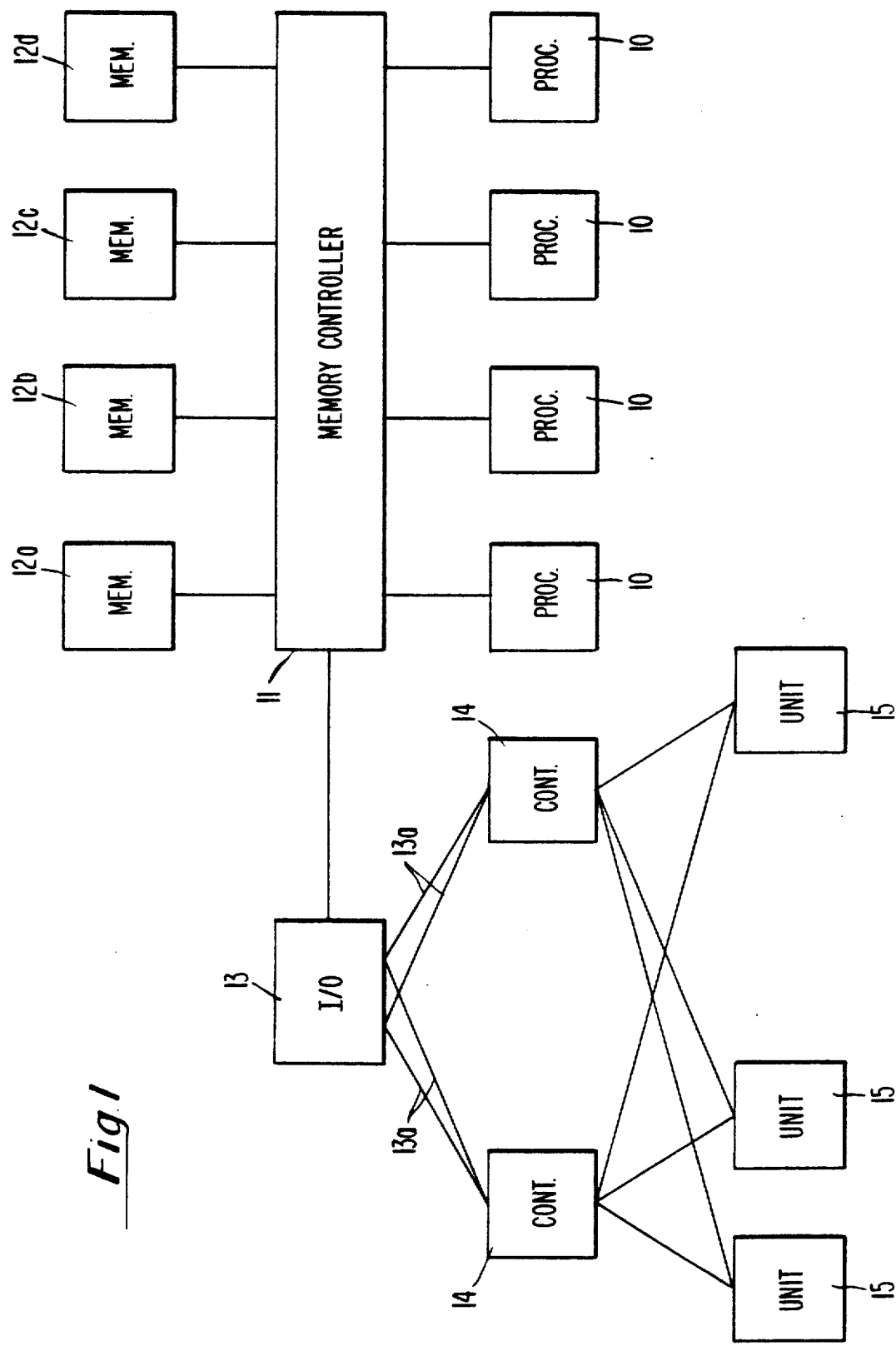
FIG. 1 is a block diagram of a system having an I/O system which employs the present invention.

A system employing the present invention is illustrated in FIG. 1. As shown therein, this system is a very large multi-processing system having a plurality of central processors 10 which are coupled to another plurality of main memory modules 12 by way of memory controller 11 which allows any processor to address any memory module.

More specifically, the present invention resides in I/O system 13 which controls all communication and data transfer between peripheral units 15 and main memory modules 12. It is to be noted in FIG. 1, that there are a plurality of controllers 14 coupled between respective peripheral units 15 and I/O system 13 by way of a plurality of different buses 13a. That is to say, that a given peripheral unit 15 can be accessed by I/O system 13 by way of alternative combinations of buses 13a and controllers 14. As employed in the present application, the term "bus" is one channel of the present invention, the port adapter. Peripheral units 15 may include any type of peripheral device or storage including large disk drives in which are stored the operating systems of the data processing system of FIG. 1 and also critical user data.

Figure 2:
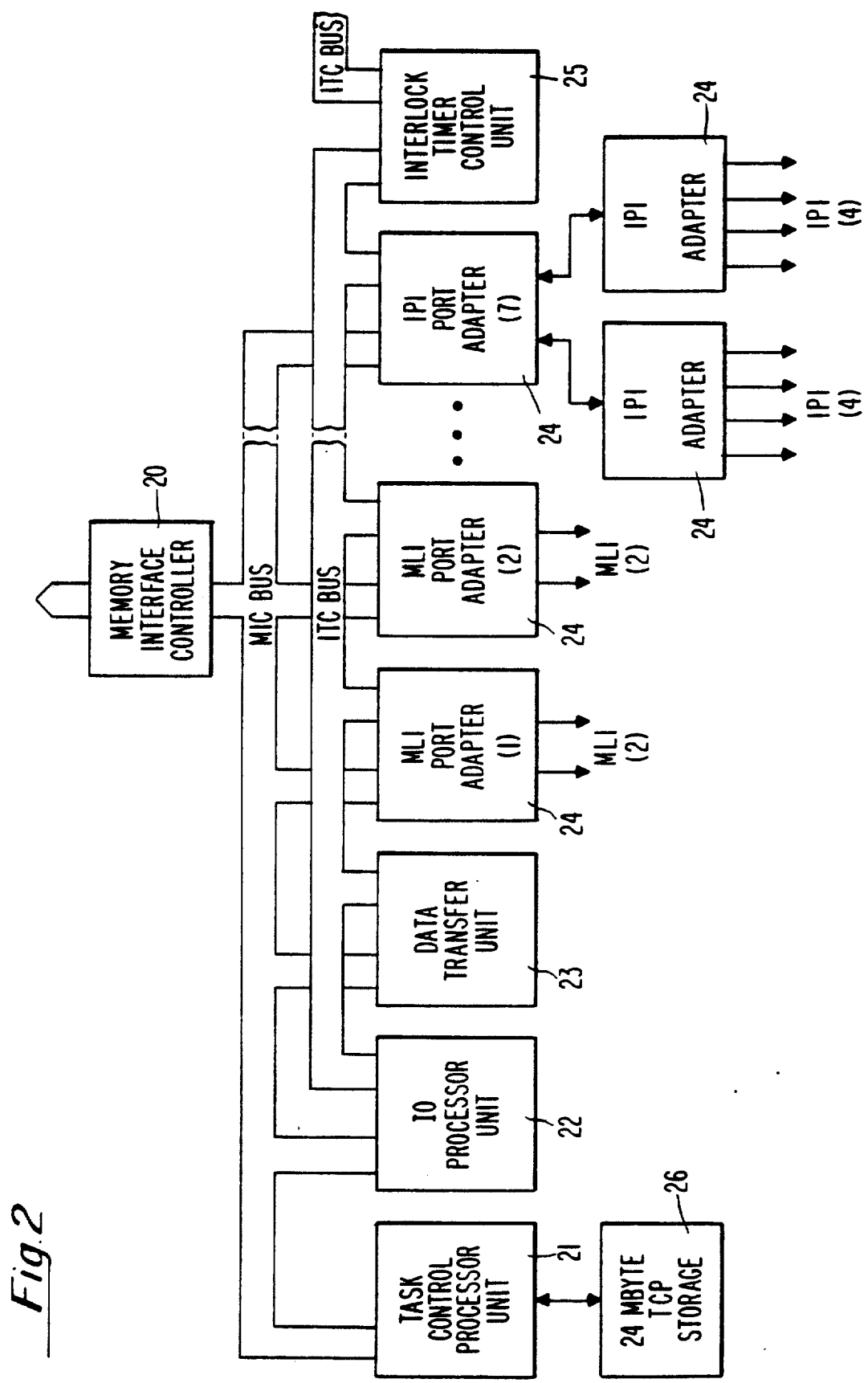
FIG. 2 is a block diagram of the input/output system employing invention.

I/O system 13 of FIG. 1 is shown in more detail in FIG. 2 and contains a number of different units that interface by way of memory interface controller (MIC) 20 with memory controller 11 of FIG. 1. As shown in FIG. 2, I/O system 13 includes Task Control Processor 21 which handles all process scheduling on respective central processors 10 of FIG. 1 and also keeps track of various events upon which different processes might be waiting. I/O processor 22 performs the bus and controller scheduling function. Data transfer unit 23 is employed to move data between different areas of memory to other areas of memory. Port adapters 24 are the heart of the present invention. They are the bus drivers for the respective buses 13a of FIG. 1 although they may employ different protocols. They perform all the functions referred to above and more fully described below. Interlock timer control 25 distributes interrupts to the various buses and also provides a queue locking mechanism by which it is guaranteed that shared queues (PQ, BQ) are not corrupted by multiple simultaneous access. Task Control Processor 21 is described in detail in the Jennings et al. application U.S. Ser. No. 787,781, now U.S. Pat. No. 4,796,178 filed Oct. 15, 1985 and assigned to the same assignee as the present invention. I/O Processor 22 is described in the Peacock application U.S. Ser. No. 926,568, filed Nov. 4, 1986 and assigned to the same assignee as the present invention.

As has been indicated above, the function of the present invention is to relieve the operating systems and the respective central processor 10, which execute those operating systems, of all I/O operations so that central processors 10 will have more time for the execution of user jobs. When a given central processor 10 is executing a process from one of memory modules 12 and encounters an I/O operation, the corresponding I/O control block is created and the I/O instruction is sent to I/O system 13 by way of memory controller 11 and the processor 10 is released to begin executing the next highest order process from one of memory modules 12. When the I/O operation has been completed, the requesting process is then rescheduled in a priority list of processes for further execution by the next available central processor 10.

Figure 3:
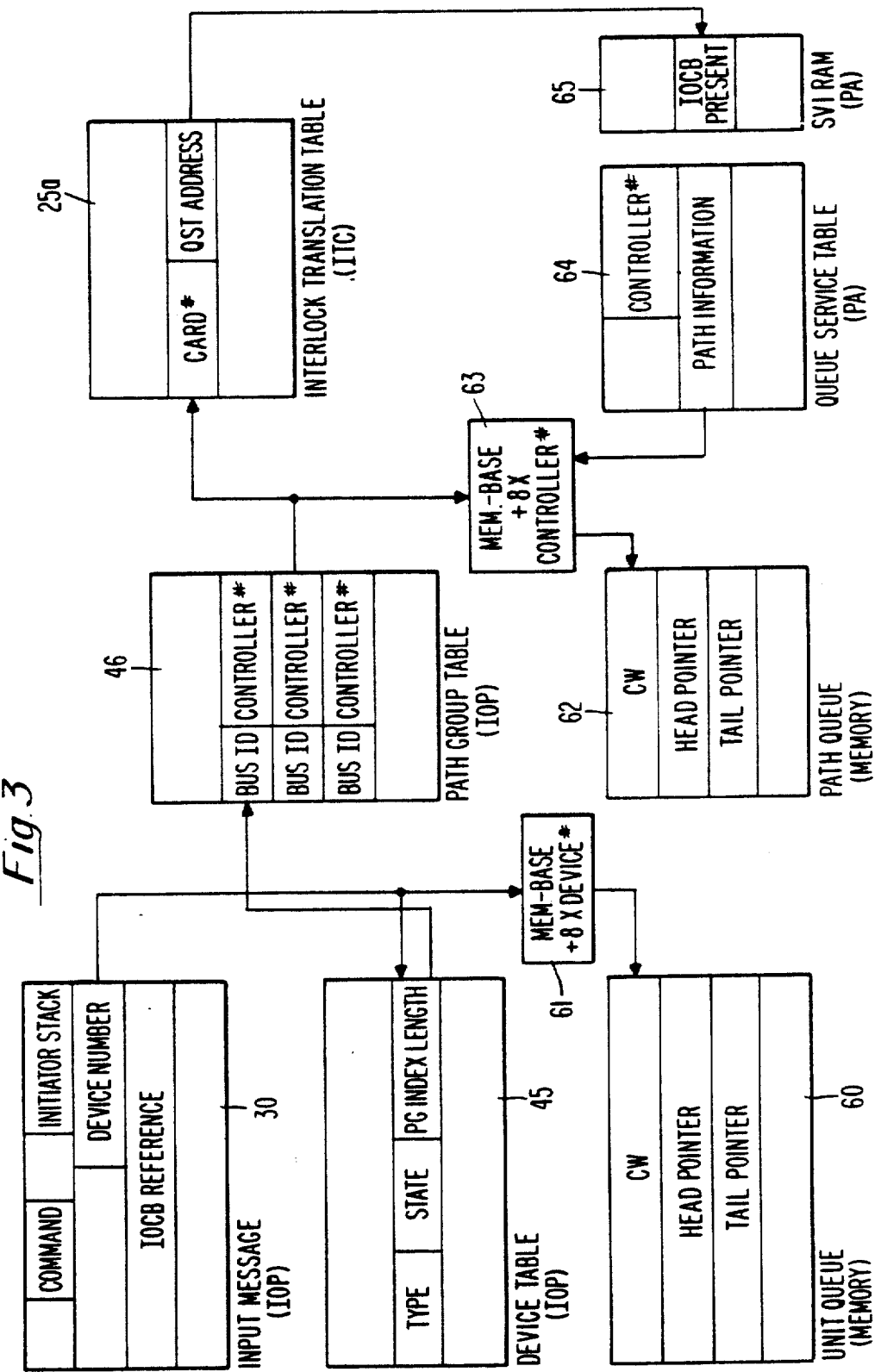
FIG. 3 is a diagram of the relation of various tables employed by the present invention which reside in the I/O Processor, main memory and in the present invention.

Before describing the details of port adapter 24 of FIG. 2, a description will first be given of the data structure linkages or linkages between tables employed by the I/O processor which are illustrated in FIG. 3. The I/O start instruction or ASYNC-SCHEDULE command is received by input message buffer 30 of FIG. 3. In FIG. 3, there is only one such command which consists of four words. The first word contains an operation command and also an indication of the initiating process which in the above-described Jennings et al. application is also referred to as a stack. The second word of the message or instruction contains a device number which identifies the device to be employed by the I/O operation. The third word contains a reference to an I/O control block (IOCB) which is created by a central processor and stored in main memory as will be more fully described below. The fourth word contains the time of the command initiation.

The I/O processor then takes the device number which addresses device table 45 of FIG. 3 which contains an entry for each device in the system. The entry includes the current status of that device and if the device is not available or not in an idle state, then the device control block is stored in a device queue in main memory until the device is idle. The term "device" is employed to mean either a bus 13a of FIG. 1, a controller 14 of FIG. 1, or a peripheral unit 15. If the device is idle, then a reference is obtained to path group table 46 of FIG. 3 which specifies which controllers and associated buses are to be employed to access the device which is normally a peripheral unit. In FIG. 3, the entry in path group table 46 indicates that three controllers can be used. Controllers servicing a unit have equal priority, and the IOP attempts to keep the load seen by each controller well balanced by its path selection algorithm. Buses servicing a controller are listed in the path group entry for that controller in priority order. Once the bus and controller combination for a given device (usually a unit) is determined, reference is made to interlock translation table 25a of interlock timer control unit 25 of FIG. 2. The proper path queue is locked via ITC. The control block is enqueued into the path queue. The path queue is unlocked and the I/O bus in a port adapter is interrupted, again via the ITC. The ITC makes a reference to interlock translation table 25a to select a port adapter to interrupt. This reference comprises a requester number indicating which of the units in FIG. 2 are requesting access to memory interface controller 20 of FIG. 2. The requester number is referred to as "CARD" number and indicates which port adapter 24 of FIG. 2 is required for servicing the selected device. Interlock translation table 25a in FIG. 3 then sends a Service Vector Interrupt (SVI) address to the selected port adapter which sets a bit in the SVI input register that in turn tells the port adapter which controller has been selected. The port adapter makes a reference to path queue 62 which contains a Q header pointing to the control blocks for the selected bus or controller. These control blocks or parts of them are passed on to the selected controller and so forth until the I/O operation is complete, in which case they are passed back to memory. When the I/O operation has been finished, the control blocks are passed back to main memory and task control processor 21 of FIG. 2 reschedules the requesting process.

DETAILED DESCRIPTION OF THE INVENTION

Figure 4:
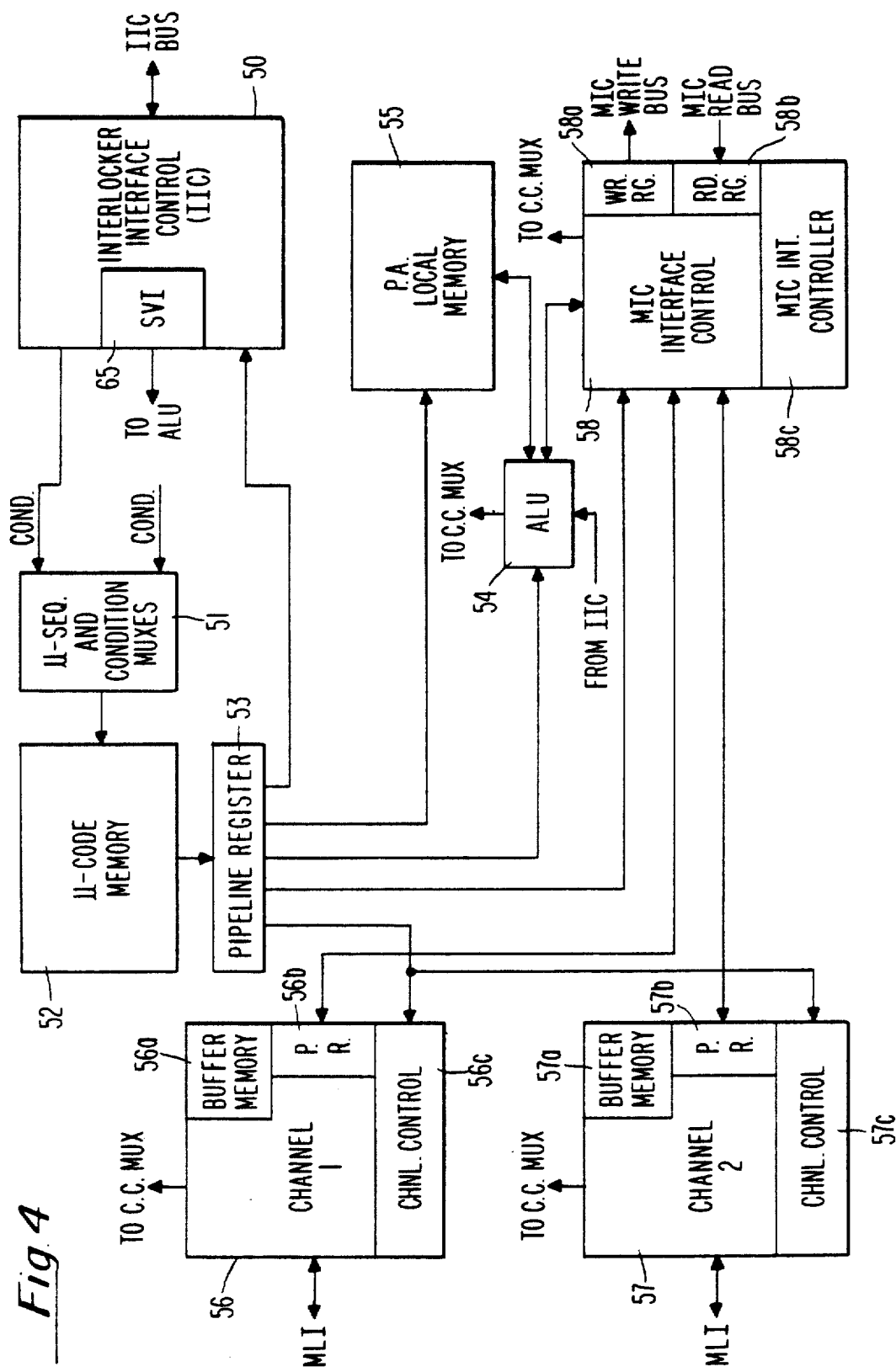
FIG. 4 is a schematic diagram of the port adapter of FIG. 2.

Port adapters 24 in FIG. 2 are shown in more detail in FIG. 4. As shown therein, a queue service table address is received by Interlocker Interface Control (IIC) 50 and stored in Service Vector Interrupt table 65. Micro sequencer and condition multiplexers 51 are then signaled to handle this system interrupt. The SVI address from Service Vector Interrupt register 65 is then sent to ALU 54 where it is multiplied by 4 to actually address the queue service table which is in local memory 55 as will be further discussed below in regard to FIG. 6. That is to say, each entry in the queue service table contains 4 words which identify the respective controller and is used with the queue identity to form a queue header and thus address the corresponding I/O control block in main memory that will be more fully described below in relation to FIGS. 5A-D. This then causes that control block to be fetched from memory to read register 58b from which it is transferred to a port adapter entry in local memory 55. All of these actions are under the control of micro-code memory 52 which is driven by micro sequencer and condition multiplexer 57.

The control signals from micro-code memory 52 control all operations in the port adapter by way of pipeline register 53 which supplies the respective control signals to the other units of the port adapter each of which units has its own controller. Pipeline register 53 is so called as it executes a micro-code instruction at the same time that micro-sequencer 57 is addressing micro-code memory 52 for the next micro-code fetch.

It will be noted in FIG. 4 that there are two channels for driving two buses at the Message Level Interface level (MLI) and the principal action of the port adapter is to receive information segments from main memory by MIC interface control 58 for transfer to the selected controller 14 of FIG. 1 by one of the two channels either channel 56 or channel 57 and also to receive information segments from the respective selected controllers by channels 56 and 57 for transfer to main memory by MIC interface control 58. Both channel 56 and channel 57 are provided with "packing" registers 56b and 57b to form six byte messages, called words, from the two byte segments transferred between the port adapter and the MLI.

When the PA is finished transferring data information between the control 15 of FIG. 1 and the memory 12 of FIG. 1, it awaits the result from the control. Once the result is received from the control, the PA verifies for the correctness of the operation. If there are no exceptions, the PA updates the IOCB in the main memory to reflect the current state of the I/O. The IOCB reflects a new memory address where the data transfer ended in the main memory. It also reflects the number of bytes the port adapter transferred between the unit 15 of FIG. 1 and the memory 12 of FIG. 1.

Figure 5A:
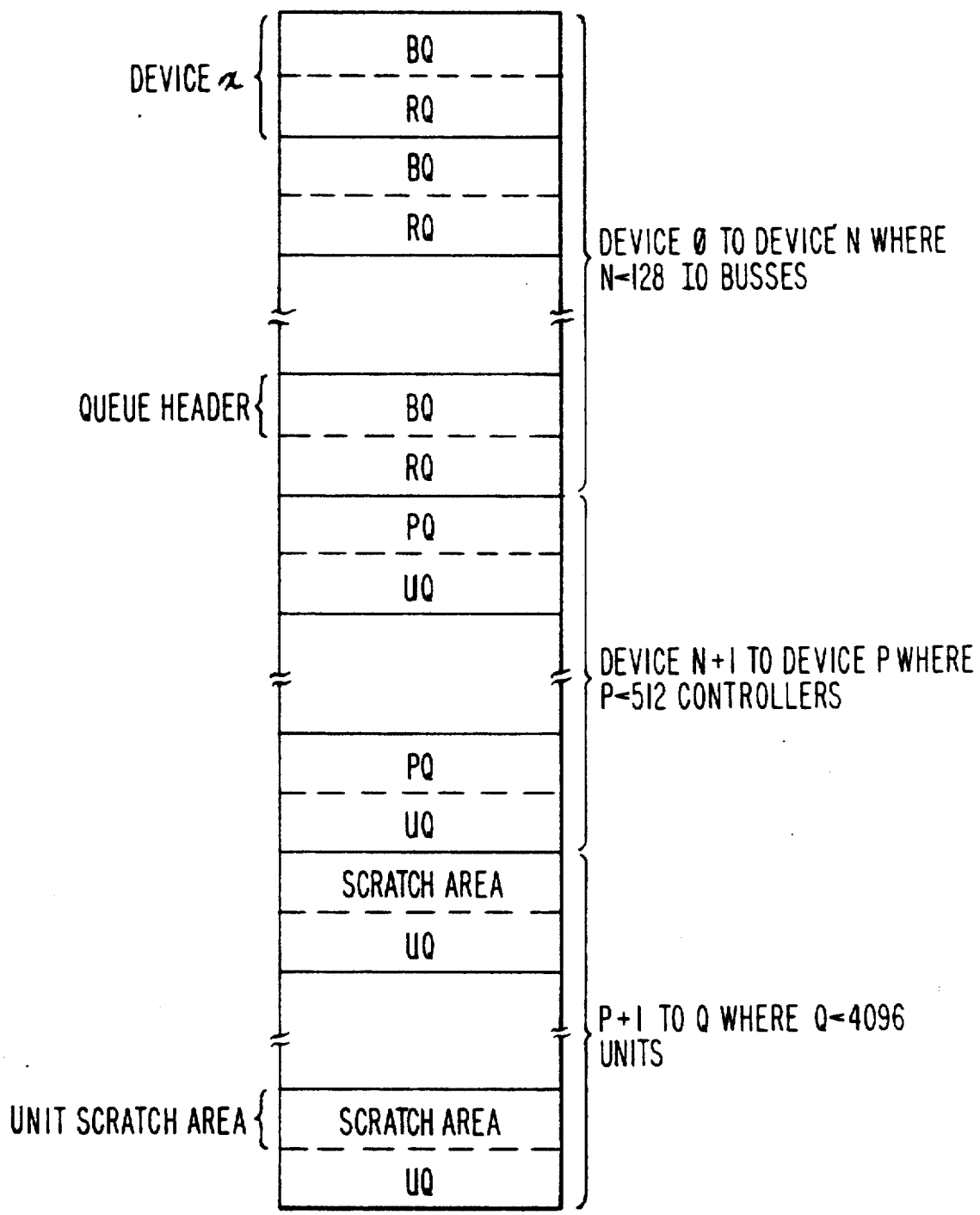

FIG. 5A is a diagram of a table in main memory of device sections, one for each device in the system where, as was mentioned above, the device may be one of the I/O buses 13a of FIG. 1 (or more particularly one bus of the port adapters 24 of FIG. 2 which drive the corresponding bus), one of controllers 14 of FIG. 1 or one of peripheral units 15 of FIG. 1. As indicated in FIG. 5A, there may be up to 128 I/O buses, up to 512 (less the number of I/O buses) controllers with the remaining devices being peripheral units up to 4,096 less the number of I/O buses and controllers.

Each device section includes two queue headers which contain pointers or memory addresses to different I/O control blocks (IOCB),there being one such block for each operation currently being performed by a device in the system. The general format of each queue header is illustrated in FIG. 5B. In FIG. 5B, the queue header is made up of a four control words. The first word contains control and status information. The second word is a pointer or an address to main memory at the beginning of the first I/O control block for that particular device. The third word is a pointer or address to main memory of the last or most recent I/O control block so that these two pointers indicate the beginning and the end of a particular queue of linked together control blocks for different jobs or tasks that have been requested of the device in question. This will be more thoroughly described in relation to FIG. 5D.

Finishing the description of FIG. 5A, the I/O bus device areas include a bus queue header into which operators for controlling the corresponding I/O bus in the port adapter are enqueued. These device areas also include a queue header for controlling the transfer of the results of the device operation from the port adapter 24 back to the IOP 22 in FIG. 2. Each of the controller device sections includes a path queue header which is used by the port adapter to fetch the corresponding control block from the memory. The controller command is then extracted from the control block and sent to the selected controller. The unit queue header points to the control blocks which are pending for a unit.

Turning now to FIG. 5D, the queuing mechanism for linking together of control blocks for different jobs or tasks requested on the particular controller is shown. As was indicated above, most of the requests for devices are requests for peripheral units 15 of FIG. 1 and there is an I/O control block for each job or task that has been requested of the respective device. The controller 14 of FIG. 1 generally can service more than one peripheral unit 15 of FIG. 1.

When an input message comes into input message buffer 30 of FIG. 3, it specifies the device number and also a reference or memory address to the particular control block for the job to be performed on that device. The IOP performs the path selection and links the IOCB into the selected controller's path queue. The port adapter servicing that controller is then interrupted via the ITC mechanism already described. As additional particular requests for different units which can be serviced by one controller come in, then the second requested control block address is inserted as the next link memory address in the head I/O control block and also in the tail pointer of the particular device queue header, as illustrated in FIG. 5D. When the port adapter is ready to service the head control block, it delinks the head control block by inserting the next link memory address of the head control block in the head pointer of the controller queue header and then zeroing it to reflect that the I/O of the control block is in progress.

FIG. 6 is a diagram illustrating the organization of local memory 55 of FIG. 4. Shown therein, the first 512 entries (0-511) contain both channel and controller information which, as was described above, is used with a queue identify to form a reference to a queue header which in turn addresses a respective I/O control block. These entries constitute Queue Service Table (QST) 64 of FIG. 3. The last set of entries (2032-4088) are in In-Progress Operation Table (IPOT) 67 which contains I/O control blocks that are currently in progress not only for the port adapter but for each I/O device being serviced by the port adapter. The middle table 66 contains various constants and variables as well as a scratch pad area and fault buffers for use by the port adapter.

Operation

The operation of the port adapter of the present invention has been generally described above in relation to FIG. 3. A particular feature of the present invention is that the two channels at the message level interface can be operated for doing data transfer simultaneously under control of one micro-code sequencer which handles all aspects of the control state on interface.

The method which allows the sequencer to simultaneously execute control algorithmns on both channels takes advantage of the fact that the respective algorithms involved contain numerous wait states, for example, wait for interrupts, wait for channels to exit a burst mode of data transfer or wait for a controller strobe. The sequencer is designed such that it has a four word deep stack (called the immediate stack) and the capability to put the next address on a remote stack (maintained in the local memory). This is implemented in an array in the sequencer. In addition, there are two channel enable flip flops, one for each channel, which are called channel 1 enable and channel 2 enable respectively. Each channel has the micro-code control signals gated with the output of the proper channel enable flip flop in the respective channel control. Only one of the channel enable flip flops is set at any given time and only the code being applicable to that channel is being executed by the sequencer. FIG. 7 is a flow chart of this method.

In FIG. 7, if the port adapter receives an interrupt, for example, from channel one, the sequencer sets the channel one enable flip flop. It then proceeds with the execution of the micro-code which services this interrupt. Somewhere during the execution of this code, the sequencer encounters a wait instruction and jumps to the appropriate IDLE-WAIT routine. In this routine, the sequencer first determines the number of the channel it is servicing from the channel enable flip flop. Next, the micro-code instruction following the wait instruction, is pushed on the appropriate channels remote stack. The sequencer then proceeds with the updating of an Interrupt State Word (ISW) which indicates whether or not the events for which each channel is waiting on exist. A bit which corresponds to the IDLE-WAIT routine is set in the wait for event field of the channel currently being serviced. Next, the wait for event field of both channels is monitored to determine the proper IDLE loop, after which the sequencer awaits for the proper events to happen. When a wait for event occurs, the sequencer sets that channel's enable flip flop, pops the microcode instruction from its remote stock and continues with the micro-code execution.

Epilogue

A port adapter has been described above for an I/O system for a large data processing system. The port adapter is coupled to an I/O processor of that system and also to main memory of the system so that when the port adapter is selected by a system interrupt message from I/O processor, it can begin and carry on its data transmission between a selected peripheral device and main memory without further assistance.

While one embodiment of the present invention has been disclosed, it will be apparent to one skilled in the art that variations and modification may be made therein without departing from the spirit and scope of the invention as claimed.

What is claimed is:

1. In a data processing system having a memory, a plurality of peripheral devices and an I/O system coupled to said memory and to said peripheral devices for controlling the transfer of data therebetween, the improvement comprising a port adaptor within said I/O system for transmitting data between said memory and said peripheral devices, said port adaptor comprising:
   memory interface means coupled to said memory;
      first and second channels coupled between said memory interface means and said peripheral devices, each channel being coupled to a different peripheral device; and
   control means including a control store for storing control sequences and sequencing means responsive to said control sequences for controlling and performing said data transfers between said memory interface means and said channel means, said sequencing means permitting only one channel to operate at a time using a control sequence applicable to the currently operable channel;
   said control store containing control sequences applicable to respective ones of said channels wherein respective control sequences applicable to said channels include wait periods occurring during data transfer operations which the respective channel waits on until the happening of one or more events,
   said control means being responsive to system interrupt messages from said I/O system for providing concurrent data transfers between said memory interface means and selected peripheral devices via said channels by providing for switching operation from one channel to the other in response to encountering a wait period during the performance of a data transfer operation for said one channel,
   said sequencing means operating in response to the occurrence of a wait period encountered while performing a control sequence for one channel to alternate its operation to the performance of a control sequence for the other channel, whereby said sequencing means can provide concurrent data transfer operations for said channels to different peripheral devices.

2. The invention in accordance with claim 1, wherein said control means includes means for storing an indication of the location within a control sequence at which an alternation to the other channel occurred.

3. The invention in accordance with claim 2, wherein said control means employs said indication to resume the respective data transfer operation for said one channel when an alternation back to said one channel occurs.

4. The invention in accordance with claim 1, wherein said control means includes means responsive to an address included within a system interrupt message for use in selecting a peripheral device for data transfer.

5. The invention in accordance with claim 4, wherein said port adaptor includes a local memory for receiving control blocks of information from said memory for each peripheral device being serviced thereby.

6. The invention in accordance with claim 5, wherein said port adaptor addresses said control blocks from said memory in response to said address.

* * * * *